US009336638B2

(12) United States Patent
He et al.

(10) Patent No.: US 9,336,638 B2
(45) Date of Patent: May 10, 2016

(54) MEDIA ITEM VALIDATION

(71) Applicant: NCR Corporation, Duluth, GA (US)

(72) Inventors: Chao He, Happy Valley (HK); Alan Greig, Scotland (GB); Gary Ross, Scotland (GB); Ping Chen, Beijing (CN); Wenjia Yin, Dundee (GB)

(73) Assignee: NCR Corporation, Duluth, GA (US)

( * ) Notice: Subject to any disclaimer, the term of this patent is extended or adjusted under 35 U.S.C. 154(b) by 24 days.

(21) Appl. No.: 14/224,849

(22) Filed: Mar. 25, 2014

(65) Prior Publication Data

US 2015/0279140 A1 Oct. 1, 2015

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2006.01) |
| ***G07D 7/04*** | (2016.01) |
| ***G07D 7/12*** | (2016.01) |
| ***G07D 7/20*** | (2016.01) |
| ***G07D 5/00*** | (2006.01) |

(52) U.S. Cl.

CPC .................. *G07D 7/00* (2013.01); *G07D 5/005* (2013.01); *G07D 7/04* (2013.01); *G07D 7/12* (2013.01); *G07D 7/121* (2013.01); *G07D 7/20* (2013.01); *G07D 7/2083* (2013.01); *G07D 7/2091* (2013.01); *G07D 2205/0012* (2013.01)

(58) Field of Classification Search

CPC ............. G07D 5/00; G07D 7/00; G07D 7/20; G07D 7/2008; G07D 7/2075; G07D 7/2083; G07D 7/2091; G07D 5/02; G07D 5/04; G07D 5/06; G07D 5/08; G07D 5/10; G07D 11/0036; G07D 11/0087; G07D 11/0084; G07D 13/00; G07D 2201/00; G07D 2205/00; G07D 2205/001; G07D 2205/0012; G07D 2207/00; G07D 2211/00; G07F 19/211; G07F 19/206; G07F 19/203; G07F 19/202; G07F 19/20; G07F 19/00; G07F 7/00; G07F 7/04; G07F 9/006; G07F 3/00; G07F 3/02

USPC ................... 194/206, 207; 209/534; 235/379; 382/134–136

See application file for complete search history.

(56) References Cited

U.S. PATENT DOCUMENTS

| | | | | | |
|---|---|---|---|---|---|
| 5,437,357 | A | * | 8/1995 | Ota | G07D 7/12 194/206 |
| 5,485,908 | A | * | 1/1996 | Wang | G07D 5/00 194/317 |
| 5,542,518 | A | * | 8/1996 | Kurosawa | G06K 9/6286 194/206 |
| 5,619,620 | A | * | 4/1997 | Eccles | G06K 9/66 382/158 |
| 5,678,677 | A | * | 10/1997 | Baudat | 194/206 |

(Continued)

FOREIGN PATENT DOCUMENTS

JP 402148383 A * 6/1990 .................... 194/207

OTHER PUBLICATIONS

English Translation of JP402148383A.*

*Primary Examiner* — Jeffrey Shapiro

(74) *Attorney, Agent, or Firm* — Schwegman, Lundberg & Woessner

(57) ABSTRACT

A method of validating a media item, comprising: for each of a plurality of sensors that sense a media item, determining a respective validation score indicating a likelihood that the sensed media item is valid; and determining if the media item is valid responsive to the plurality of validation scores. Apparatus for validating a media item and a document processing module are also provided.

9 Claims, 3 Drawing Sheets

(56) References Cited

U.S. PATENT DOCUMENTS

| | | | | | |
|---|---|---|---|---|---|
| 5,796,869 | A * | 8/1998 | Tsuji | G03G 21/046 | 382/187 |
| 5,884,296 | A * | 3/1999 | Nakamura | G06T 7/402 | 382/155 |
| 5,992,600 | A * | 11/1999 | Baudat | G06K 9/6267 | 194/207 |
| 6,157,895 | A * | 12/2000 | Nakajima | G07D 7/168 | 250/548 |
| 6,192,351 | B1 * | 2/2001 | Persaud | G06K 9/00536 | 382/156 |
| 6,236,745 | B1 * | 5/2001 | Chen | G07D 7/00 | 382/135 |
| 6,705,448 | B1 * | 3/2004 | Steel | 194/302 | |
| 6,990,474 | B2 * | 1/2006 | Woods | G07D 7/185 | 706/1 |
| 7,097,022 | B2 * | 8/2006 | Mukai | G07D 7/2058 | 194/207 |
| 7,856,137 | B2 * | 12/2010 | Yonezawa | G06K 9/00899 | 194/328 |
| 7,913,832 | B2 * | 3/2011 | Voser | G07D 7/00 | 194/207 |
| 8,077,961 | B2 * | 12/2011 | Schmalz | G07D 7/20 | 382/135 |
| 8,086,017 | B2 * | 12/2011 | He | G06K 9/00 | 356/71 |
| 8,503,796 | B2 * | 8/2013 | He | G06K 9/6267 | 382/224 |
| 8,611,665 | B2 * | 12/2013 | He | G06K 9/00 | 382/181 |
| 8,797,516 | B2 * | 8/2014 | Stockli | G07D 7/00 | 356/71 |
| 2002/0043560 | A1 * | 4/2002 | Woods | G07D 7/185 | 235/438 |
| 2003/0150687 | A1 * | 8/2003 | King | 194/207 | |
| 2004/0084278 | A1 * | 5/2004 | Harris et al. | 194/302 | |
| 2004/0213448 | A1 * | 10/2004 | Jou | G07D 7/00 | 382/135 |
| 2006/0098859 | A1 * | 5/2006 | Anouar | G07D 7/20 | 382/135 |
| 2006/0254876 | A1 * | 11/2006 | Baudat | 194/206 | |
| 2010/0116619 | A1 * | 5/2010 | Jones | 194/217 | |

* cited by examiner

MEDIA ITEM VALIDATION

FIELD OF THE INVENTION

The present invention relates to media item validation and counterfeit detection. In particular, but not exclusively, the present invention relates to sensing a media item, such as a banknote, and determining if the media item is valid, suspect or counterfeit.

Various situations are known in which media items are transported along different transport pathways in a Self Service Terminal (SST). In typical a SST, such as a banknote depositing Automated Teller Machine (ATM), an ATM customer is allowed to deposit one or more banknotes (without having to place a banknote in a deposit envelope) in a publically accessible, unattended environment. To deposit a banknote, the ATM customer inserts an identification card through a card slot at the ATM, enters a total value of banknotes being deposited, and then inserts the banknote to be deposited through a deposit slot of a banknote acceptor. A transport mechanism receives the inserted banknote and transports the banknote in a forward direction along an infeed transport path to a number of locations within the ATM to process the banknote. One such location includes a validator which examines the banknote, or similar media item such as cheques, vouchers, coupons, giros, or the like, for a number of purposes, including validation and counterfeit detection.

A conventional validator includes a transport mechanism for transporting the banknote along a transport path, a camera located on one side of the transport path to take an image of the banknote and an LED array located on the same side and/or other side of the transport path for illuminating the banknote. The camera may take the form of an optical image sensor and other sensors, such as a magnetic sensor and an ultraviolet sensor, or the like, may also be included in the validator.

Article 6 of ECB (European Central Bank) Council Regulation No. 1338/2001 provides measures necessary for the protection of the Euro against counterfeiting. This article obliges banknote handling machines, especially customer-operated machines such as cash-accepting or cash-recycling ATMs, to be capable of categorising the deposited banknotes as genuine, counterfeit or suspect if recognised. Other countries have either adopted this regulation or published similar regulations in their own currencies, e.g. USA. Therefore, a reliable decision making mechanism in compliance with the above regulation must be established for currency validation in automated cash acceptors and recyclers.

A mechanism is typically required to combine the validation decisions from each of the multiple heterogeneous sensors, such as an optical image sensor, a magnetic sensor and an ultraviolet sensor. A conventional method is by voting, e.g. majority vote or a unanimous vote. However, since this method only considers the final decision of ‘genuine’ or ‘counterfeit’ of each sensor and disregards how confident each sensor believes a banknote to be genuine or counterfeit, the final decision may not be accurate. A requirement therefore exists to improve the accuracy of banknote validation methods and apparatus.

SUMMARY OF THE INVENTION

It is an aim of certain embodiments of the present invention to at least partly mitigate the above-mentioned problems.

It is an aim of certain embodiments of the present invention to provide an accurate, reliable, automatic and simple method of determining if a media item is valid, suspect or counterfeit.

It is an aim of certain embodiments of the present invention to provide a method and apparatus for determining a likelihood that a media item is valid, suspect or counterfeit.

It is an aim of certain embodiments of the present invention to provide a method and apparatus for determining the authenticity of a media item via a number of different sensors, wherein a weighting factor is applied to each sensor to reflect, for example, the importance of each sensor responsive to a particular configuration and/or application.

According to a first aspect of the present invention there is provided a method of validating a media item, comprising:

for each of a plurality of sensors that sense a media item, determining a respective validation score F indicating a likelihood that the sensed media item is valid; and determining if the media item is valid responsive to the plurality of validation scores.

Aptly, the method further comprises:

comparing each respective validation score F to at least one predetermined threshold $\tau$ to generate a threshold result; and responsive to said threshold result, determining a modified validation score x for each of said sensors.

Aptly, the method further comprises:

combining the modified validation scores x for each sensor to determine a combined validation score y; and generating a validation result responsive to said combined validation score y to determine if the media item is valid.

Aptly, the method further comprises:

applying a validation rule to said combined validation score y to determine said validation result, wherein said validation result is one of ‘genuine’, ‘suspect’ or ‘counterfeit’.

Aptly, said validation rule comprises:

$$0.75 \le y \le 1 = \text{genuine};$$

$$0.5 \le y < 0.75 = \text{suspect; and}$$

$$0 \le y < 0.5 = \text{counterfeit.} \qquad (1)$$

Aptly, the method further comprises:

applying a membership function to each respective validation score F to determine said modified validation score x for each of said sensors, wherein the at least one membership function comprises said at least one predetermined threshold $\tau$.

Aptly, said membership function comprises:

$$\begin{cases} x = 1 & \text{if } F \ge \tau \\ x = \left(1 + \dfrac{(F-\tau)+(F-\tau/2)}{\tau/2}\right)\Big/2 & \text{if } \tau/2 \le F < \tau \\ x = 0 & \text{if } F < \tau/2 \end{cases} \qquad (2)$$

Aptly, said membership function comprises:

$$\begin{cases} x = 1, & \text{if } F \le \tau_1 \\ x = \left(1 + \dfrac{(\tau_1 - F)+(\tau_2 - F)}{\tau_2 - \tau_1}\right)\Big/2, & \text{if } \tau_1 < F \le \tau_2, \\ x = 0, & \text{if } F > \tau_2 \end{cases} \qquad (3)$$

said at least one predetermined threshold $\tau$ comprising threshold limits $\tau_1$ and $\tau_2$.

Aptly, the at least one predetermined threshold $\tau$ is selectively adjustable.

Aptly, the method further comprises:

applying a weighting factor $\omega_i$ to each of the plurality of sensors.

Aptly, a sum of the weighting factors is 1, i.e. $\Sigma\omega_i=1$.

Aptly, each weighting factor is selectively adjustable and/or optimizable.

Aptly, said plurality of sensors comprises an optical image sensor and at least one of a magnetic sensor and an ultraviolet sensor.

Aptly, the media item is a financial media item, such as a banknote or cheque.

According to a second aspect of the present invention there is provided apparatus for validating a media item, comprising:

a plurality of sensors for sensing a media item; and a processor operable to determine a respective validation score F for each of said sensors, wherein each validation score F indicates a likelihood that a sensed media item is valid, the processor being further operable to determine if the media item is valid responsive to the plurality of validation scores.

Aptly, said plurality of sensors comprises an optical image sensor and at least one of a magnetic sensor and an ultraviolet sensor.

According to a third aspect of the present invention there is provided a document processing module comprising apparatus according to the second aspect of the present invention.

According to a fourth aspect of the present invention there is provided a Self-Service Terminal (SST) comprising a document processing module according to the third aspect of the present invention.

According to a fifth aspect of the present invention there is provided a method of determining the authenticity of a media item, comprising:

determining a respective validation decision for each of a plurality of sensors that sense a media item, wherein each validation decision indicates a degree of authenticity of the media item; and determining the authenticity of said media item responsive to a combination of the determined validation decisions.

According to a sixth aspect of the present invention there is provided a product which comprises a computer program comprising program instructions for validating a media item via the steps of:

for each of a plurality of sensors, determining a respective validation score F indicating a likelihood that the sensed media item is valid; and determining if the media item is valid responsive to the plurality of determined validation scores.

Certain embodiments of the present invention may provide a method and apparatus for accurately and reliably determining the likelihood that a media item is valid.

Certain embodiments of the present invention may provide a method and apparatus for indicating whether a sensed media item is absolute counterfeit, absolutely genuine, and anything in between indicating a degree of authenticity.

Certain embodiments of the present invention may provide a method and apparatus to determine the authenticity of a media item by using a plurality of sensors, whilst introducing a weighting factor to each of the sensors reflecting the importance of the different sensors.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
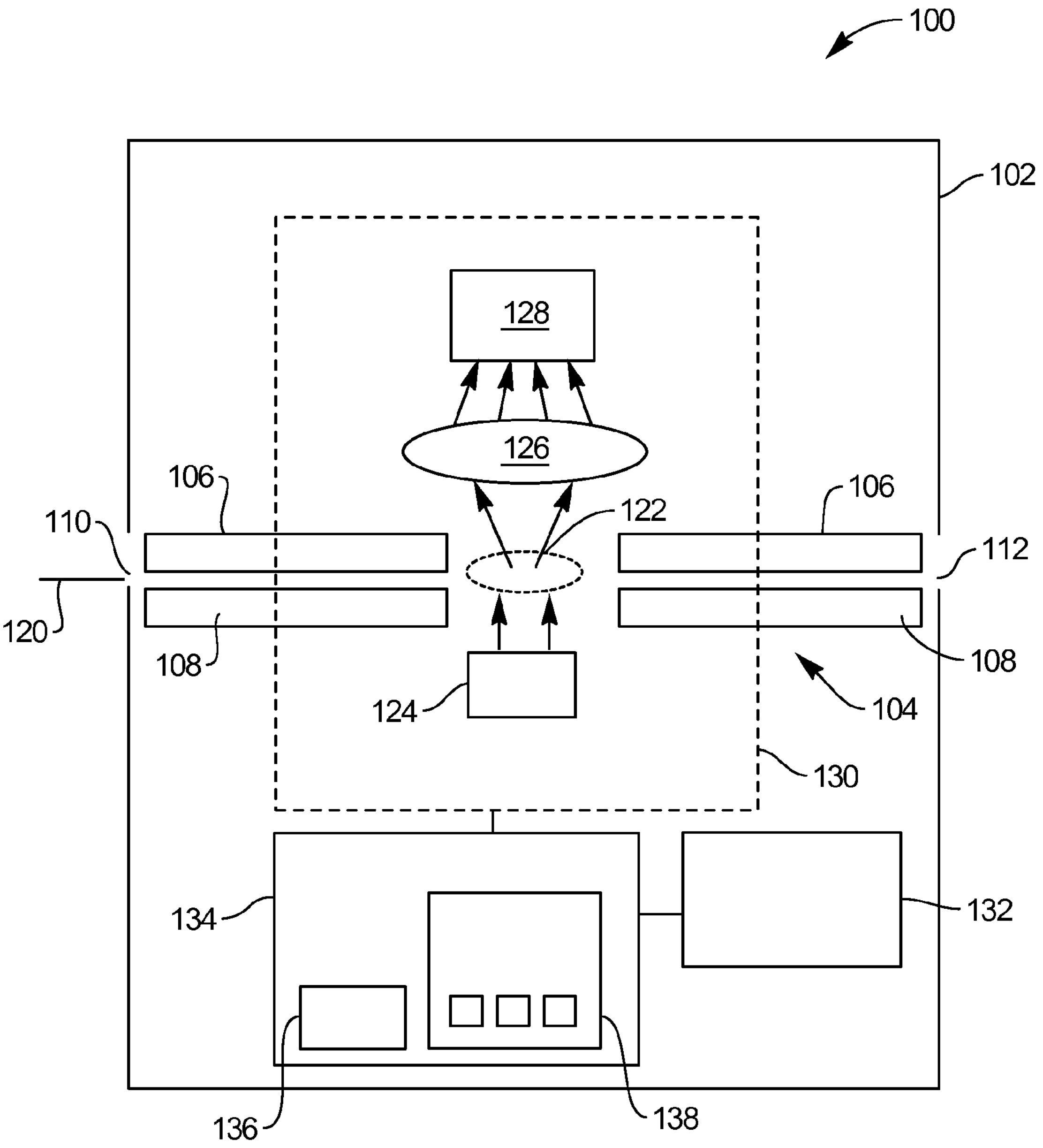
FIG. 1 illustrates a schematic diagram of a banknote validator according to one embodiment of the present invention.

In the drawings like reference numerals refer to like parts.

FIG. 1 illustrates a media item validator 100 (in the form of a banknote validator) for implementing, inter alia, a method of validating a banknote according to one embodiment of the present invention. Other types of media item may of course be validated, such as cheques, coupon, giros, tokens, vouchers, or the like.

The banknote validator 100 includes a housing 102 which supports a transport mechanism 104 in the form of a train of pinch rollers 106, 108 extending from an entrance port 110 to a capture port 112. The pinch rollers include upper pinch rollers 106 aligned with and spaced apart from lower pinch rollers 108.

The entrance and capture ports 110, 112 are in the form of apertures defined by the housing 102. In use, the capture port 112 would typically be aligned with parts of a depository module.

In use, the pinch rollers 106, 108 guide a banknote 120 short edge first (or long edge first depending on the transport path set-up) through an examination area 122 defined by a gap between adjacent pinch roller pairs. While the banknote 120 is being conveyed through the examination area 122, the banknote 120 is illuminated selectively by an illumination source arranged to illuminate across the banknote 120 as it passes through the validator 100. The illumination source 124 may be one or more of an IR illumination source, a RGB illumination source and a UV illumination source. The illumination source may be located on the opposite side of the transport path to the optical imager 128, as shown in FIG. 1, for capturing a transmission image of the banknote where light is passed through the banknote and/or the illumination source may be located on the same side of the transport path as the optical imager 128 for capturing a reflection image of the banknote where light is reflected off reflective features of the banknote. Additional illumination sources and/or sensors are provided for other functions of the banknote validator 100, such as a magnetic sensor, for example. Different types of sensor are typically provided to detect and determine the validity of corresponding features of a media item, such as a foil strip, hologram, and fluorescent feature of a banknote, for example.

For simplicity, the illumination source 124 is shown in FIG. 1 as an infrared LED array, such that when the infrared LEDs 124 are illuminated, the emitted infrared radiation is incident on an underside of the banknote 120 and an optical lens 126 focuses light transmitted through the banknote 120 to the optical imager 128 (in this embodiment a CCD Contact Image Sensor (CIS). This provides a transmitted infrared channel output from the optical imager 128. In this embodiment, the optical imager comprises an array of elements, each element providing an 8-bit value of detected intensity. The CIS 128 in this embodiment is 200 dots per inch sensor but the outputs are averaged, in this embodiment, so that 25 dots per inch are provided. It will be understood that alternatively or in addition to an infrared LED array, other illumination sources are envisaged such as an RGB output device and UV illumination sources for capturing reflection and/or transmission image types of a banknote.

The illumination source 124, lens 126 and imager 128 comprise an image collection component 130.

Figure 2:
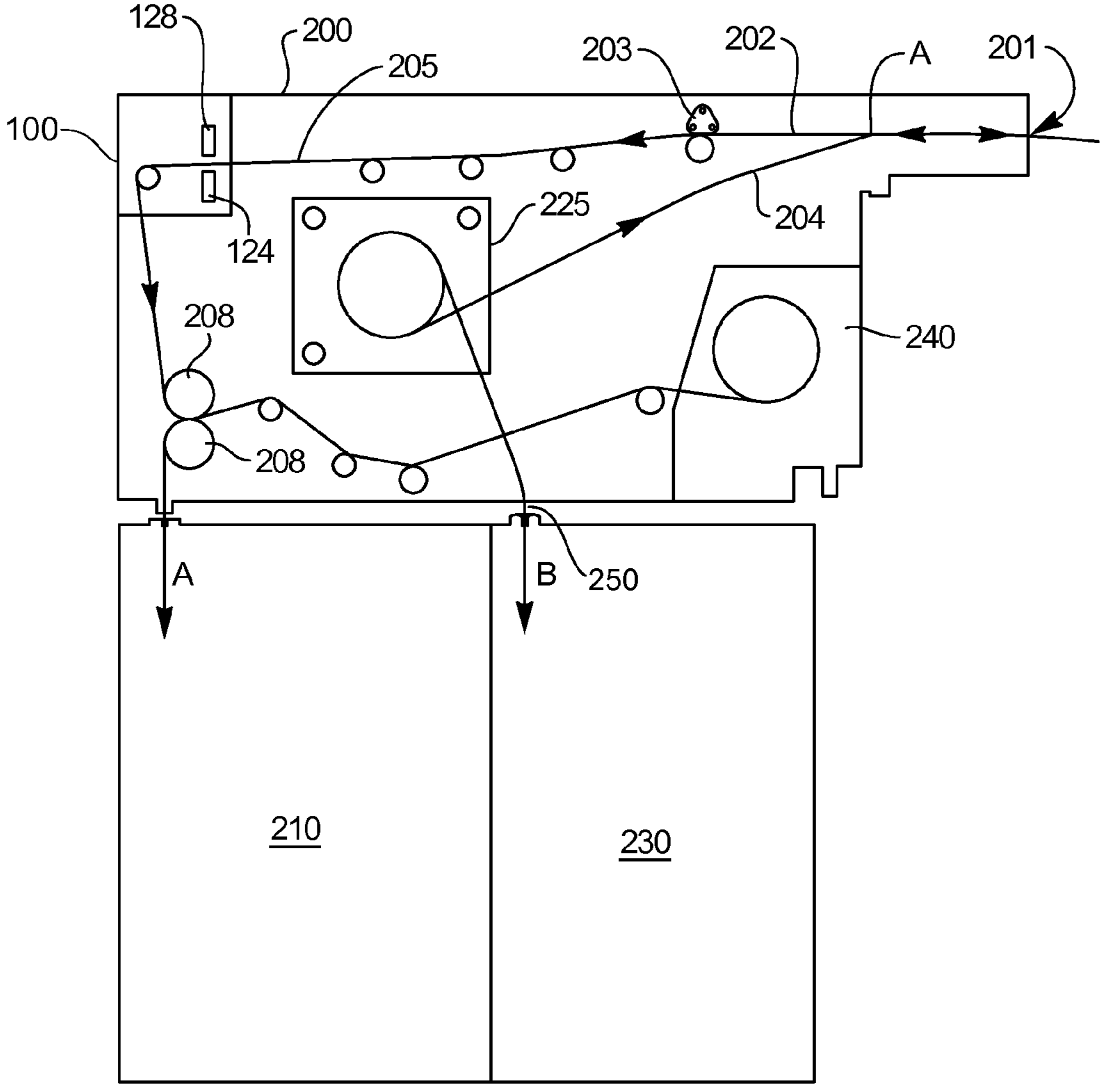
FIG. 2 illustrates a document processing module including the banknote validator of FIG. 1.

The banknote validator 100 includes a data and power interface 132 for allowing the banknote validator 100 to transfer data to an external unit, such as an ATM (as shown in FIG. 2), a media depository (not shown), or a computer (not shown), and to receive data, commands, and power therefrom. The banknote validator 100 will typically be incorporated into a media depository, which would typically be incorporated into an ATM.

The banknote validator 100 also includes a controller 134 including a Digital Signal Processor (DSP) 136 and an associated memory 138. The controller 134 controls the pinch rollers 106, 108 and the image collection components 130 (including energising and de-energising the illuminating source 124). The controller 134 also collates and processes data captured by the image collection component 130, and communicates this data and/or results of any analysis of this data to the external unit via the data and power interface 132. The controller 134 also receives the illumination transmission data from the optical imager 128, for example.

As illustrated in FIG. 2, a document processing module 200 has an access mouth 201 through which incoming cheques and/or banknotes are deposited or outgoing cheques are dispensed. This mouth 201 is aligned with an infeed aperture in the ATM. A bunch of one or more banknotes or cheques is input or output via the infeed aperture of the ATM. Aptly, a bunch of a hundred items or more can be received/dispensed. Incoming banknotes or cheques follow a first transport path 202 away from the mouth 201 in a substantially horizontal direction from right to left as shown in FIG. 2. The first transport path 202 is also referred to as the infeed path. The banknotes or cheques then pass through a feeder/separator 203 and along another pathway portion 205 which is also substantially horizontal and right to left. The banknotes or cheques then individually enter the validator module of FIG. 1 which includes the illumination source 124 and imager 128.

The cheques or banknotes are then directed substantially vertically downwards to a point between two nip rollers 208. These nip rollers co-operate and are rotated in opposite directions with respect to each other to either draw deposited cheques or banknotes inwards (and urge those cheques towards the right hand side in FIG. 2), or during another mode of operation, the rollers can be rotated in an opposite fashion to direct processed cheques or banknotes downwards in the direction shown by arrow A in FIG. 2 into a cheque bin 210. Incoming cheques or banknotes which are moved by the nip rollers 208 towards the right can either be diverted upwards (in FIG. 2) into a re-buncher unit 225, or downwards in the direction of arrow B in FIG. 2 into a cash bin 230, or to the right hand side shown in FIG. 2 into an escrow 240. Cheques or banknotes from the escrow can be directed to the re-buncher 225 or downwards into the cash bin 230. Cheques or banknotes can be reprocessed or returned to a customer via a further transport path 204, also known as the return path.

Figure 3:
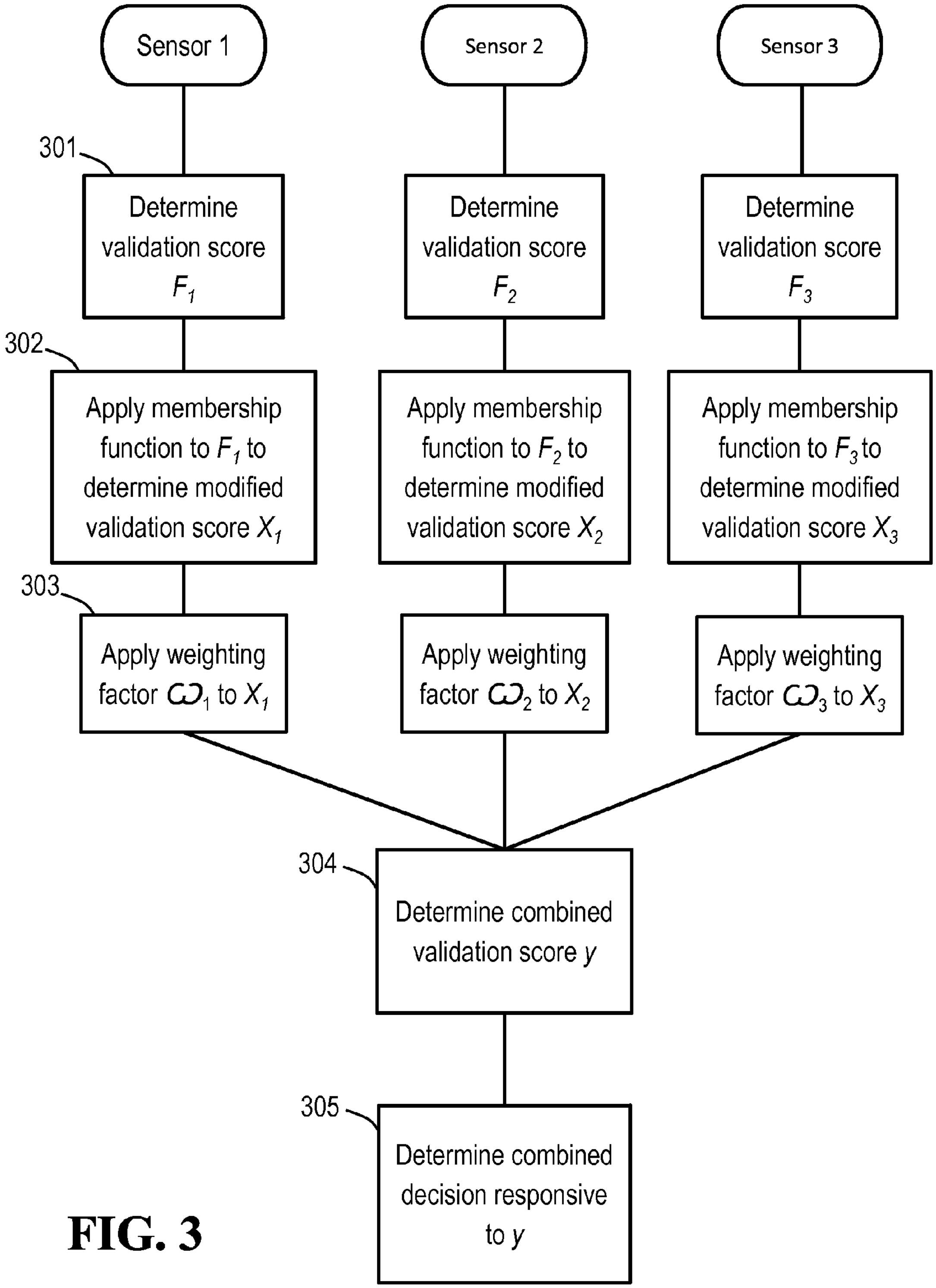
FIG. 3 illustrates a flow chart outlining a method of validating a media item according to one embodiment of the present invention.

In accordance with certain embodiments of the present invention, the imager 128 obtains a digital image of a banknote 120 located on the transport path 205. The digital image of the banknote is then used to extract certain elements of the image and compare the same with a stored database to determine a likelihood of authenticity of the banknote. A magnetic sensor of the validation module senses a magnetic feature of the banknote to determine the likelihood that the sensed media item is valid. Furthermore, an ultraviolet sensor further determines the likelihood that the sensed media item is valid based on a fluorescent element of the banknote. These sensors are illustrated in FIG. 3. It will be understood that any number and type of sensors may be utilised in accordance with the present invention.

As shown in step 301 of FIG. 3, a validation score F is determined for each of the individual sensors by controller 134. A membership function is then applied (at step 302) to each respective validation score F to determine a modified validation score x for each of said sensors, wherein the membership function comprises at least one predetermined threshold $\tau$:

$$\begin{cases} x = 1 & \text{if } F \geq \tau \\ x = \left(1 + \dfrac{(F-\tau)+(F-\tau/2)}{\tau/2}\right)\Big/2 & \text{if } \tau/2 \leq F < \tau \\ x = 0 & \text{if } F < \tau/2 \end{cases} \quad (1)$$

Depending on the type of sensor, the predetermined threshold $\tau$ may be a single threshold (as shown in equation (1) above) or may comprise upper and lower threshold limits, $\tau_1$ and $\tau_2$, as shown in membership function (2) below:

$$\begin{cases} x = 1, & \text{if } F \leq \tau_1 \\ x = \left(1 + \dfrac{(\tau_1 - F)+(\tau_2 - F)}{\tau_2 - \tau_1}\right)\Big/2, & \text{if } \tau_1 < F \leq \tau_2 \\ x = 0, & \text{if } F > \tau_2 \end{cases} \quad (2)$$

An individual sensor applying only one level of the threshold $\tau$ for authenticity determination can only distinguish between genuine and counterfeit, whilst an individual sensor applying two level thresholds $\tau_1$ and $\tau_2$ for authenticity determination can distinguish between genuine, suspect and counterfeit.

Following membership functions (1) or (2) for a particular sensor, each validation score F for a respective sensor can be normalised into a modified validation score x of from 0 to 1, and therebetween, with 0 indicating absolute counterfeit, 1 indicating absolutely genuine, and anything in between indicating a degree of authenticity for that particular sensor. The above membership functions (1) and (2) introduce 'fuzziness', or a degree of fuzzy logic, to each validation score for a respective sensor, i.e. a degree of authenticity or suspect factor for each sensor, rather than a 'hard' voting-based method as conventionally used. It will be understood that membership functions (1) and (2) are examples of fuzzy logic membership functions. Any other membership functions may be envisaged depending on a particular application.

The at least one predetermined threshold $\tau$ (or $T_1$ and $\tau_2$) may be selectively adjustable for a particular configuration and/or application. Such thresholds may be adjusted according to, for example, a banking establishment's tolerance level for the performance-risk trade-off, or according to specific requirements for a particular country and/or currency. Such thresholds may also be determined for each currency automatically at the training stage by assessing the data of a large quantity of banknotes from the same class (same currency, series, denomination and orientation) via an intelligent machine learning algorithm.

Furthermore, the respective validation scores F may be weighted (as shown at step 303) dependent on a respective sensor. For example, a validation score from an optical sensor may be of greater importance than the validation score from a magnetic and/or ultraviolet sensor, for example, depending on a particular configuration/application of the validation module. A weighting factor $\omega_i$ applied to each sensor score may be selectively adjustable and/or optimizable. Adjustment of a weighting factor may be useful according to a security feature design for a particular currency. For example, if there is no magnetic feature on a particular currency to be validated, a corresponding weighting factor for the magnetic sensor of the validator module can be set to zero. Furthermore, the weighting factors may be optimized according to TAR (true accept rate of genuine banknotes) and/or FAR (false accept rate of counterfeit banknotes) performance targets. As will be understood in the art, TAR and FAR are statistics used to measure the acceptance performance when performing a verification task, such as the percentage of times a banknote validator correctly or incorrectly determines the validity of a genuine or counterfeit banknote respectively. It is possible to use genetic algorithms (or evolutionary algorithms) to intelligently optimise the weighting factors, where the TAR and FAR statistics can be used to easily form the fitness function that is required for operating a genetic algorithm.

A sum of the weighting factors $\Sigma\omega_i$ equals 1 so that, for example, an optical sensor may have a weighting factor of 0.5, and a magnetic sensor and a UV sensor may each have a weighting factor of 0.25.

A sum of the weighted modified validation scores $x_i$ is then determined (at step 304) following equation (3) below:

$$y = \sum_i \omega_i x_i \tag{3}$$

wherein, y is a combined validation score for a particular banknote based on the individual weighted validation scores $x_i$ for the different sensors.

This combined validation score can then be used (at step 305) to determine a combined decision for the media item by applying the following membership functions to the combined validation score:

$$0.75 \le y \le 1 = \text{genuine};$$

$$0.5 \le y < 0.75 = \text{suspect; and}$$

$$0 \le y < 0.5 = \text{counterfeit}. \tag{4}$$

It will be understood that the parameters in (4) are for example only and they can be adjusted according to the requirements of a banking establishment and/or field performance, for example. It will also be understood that although three different sensors are described for the purposes of certain embodiments of the present invention, the weighting factors can be used for combining any number and type of sensor sources. Aptly, the sum of the weighting factors is 1. The present invention according to certain embodiments of the present invention may therefore provide a method and apparatus for normalising and introducing fuzzy logic to each of a plurality of sensor validation scores and then combining the validation scores to determine a degree of authenticity of a media item. Certain embodiments of the present invention may provide a unified framework to combine decisions from multiple heterogeneous sensors. The introduction of fuzzy logic provides a more reliable and accurate combined decision than conventional voting-based combination methods. A method in accordance with certain embodiments of the present invention may be applied to combine any number and type of sensors for validating a media item. The present invention according to certain embodiments may provide a method and apparatus which complies with the ECB Article 6 regulatory requirements.

Throughout the description and claims of this specification, the words “comprise” and “contain” and variations of them mean “including but not limited to” and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

What is claimed is:

1. A method of validating a media item, comprising:

for each of a plurality of sensors that sense a media item, determining, by a processor of a media validator, a respective validation score F indicating a likelihood that the sensed media item is valid;

determining, by the processor, if the media item is valid responsive to the plurality of validation scores by using a fuzzy logic approach rather than a voting-based approach;

comparing each respective validation score F to at least one predetermined threshold $\tau$ to generate a threshold result; and responsive to said threshold result, determining a modified validation score x for each of said sensors; and applying a membership function to each respective validation score F to determine said modified validation score x for each of said sensors, wherein the at least one membership function comprises said at least one predetermined threshold $\tau$, wherein said membership function comprises:

$$\begin{cases} x = 1 & \text{if } F \ge \tau \\ x = \left(1 + \dfrac{(F-\tau)+(F-\tau/2)}{\tau/2}\right)\Big/2 & \text{if } \tau/2 \le F < \tau \\ x = 0 & \text{if } F < \tau/2 \end{cases}.$$

2. The method as claimed in claim 1, further comprising: combining the modified validation scores x for each sensor to determine a combined validation score y; and generating a validation result responsive to said combined validation score y to determine if the media item is valid.

3. The method as claimed in claim 2, further comprising: applying a validation rule to said combined validation score y to determine said validation result, wherein said validation result is one of 'genuine', 'suspect' or 'counterfeit'.

4. The method as claimed in claim 3, wherein said validation rule comprises:

$$0.75 \le y \le 1 = \text{genuine};$$

$$0.5 \le y < 0.75 = \text{suspect; and}$$

$$0 \le y < 0.5 = \text{counterfeit}.$$

5. The method as claimed in claim 1, further comprising: applying a weighting factor ω to each of the plurality of sensors.

6. The method as claimed in claim 5, wherein a sum of the weighting factors is 1.

7. The method as claimed in claim 5, wherein each weighting factor is selectively adjustable and/or optimizable.

8. The method as claimed in claim 1, wherein said plurality of sensors comprises an optical image sensor and at least one of a magnetic sensor and an ultraviolet sensor.

9. A method of validating a media item, comprising:

for each of a plurality of sensors that sense a media item, determining, by a processor of a media validator, a respective validation score F indicating a likelihood that the sensed media item is valid;

determining, by the processor, if the media item is valid responsive to the plurality of validation scores by using a fuzzy logic approach rather than a voting-based approach;

comparing each respective validation score F to at least one predetermined threshold τ to generate a threshold result; and responsive to said threshold result, determining a modified validation score x for each of said sensors; and applying a membership function to each respective validation score F to determine said modified validation score x for each of said sensors, wherein the at least one membership function comprises said at least one predetermined threshold τ, wherein said membership function comprises:

$$\begin{cases} x = 1, & \text{if } F \le \tau_1 \\ x = \left(1 + \dfrac{(\tau_1 - F) + (\tau_2 - F)}{\tau_2 - \tau_1}\right)\Big/2, & \text{if } \tau_1 < F \le \tau_2 \\ x = 0 & \text{if } F > \tau_2 \end{cases},$$

,said at least one predetermined threshold t comprising threshold limits $\tau_1$ and $\tau_2$.

* * * * *